United States Patent
Kimba Dit Adamou (10) Patent No.: US 12,452,711 B2
(45) Date of Patent: Oct. 21, 2025

(54) LAYER 2 MEASUREMENT METHOD AND NETWORK SIDE DEVICE

(71) Applicant: VIVO MOBILE COMMUNICATION CO., LTD., Dongguan (CN)

(72) Inventor: Boubacar Kimba Dit Adamou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 478 days.

(21) Appl. No.: 17/956,790

(22) Filed: Sep. 29, 2022

(65) Prior Publication Data

US 2023/0012910 A1 Jan. 19, 2023

Related U.S. Application Data

(63) Continuation of application No. PCT/CN2021/086173, filed on Apr. 9, 2021.

(30) Foreign Application Priority Data

Apr. 9, 2020 (CN) .......................... 202010276320.5

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 76/12* (2018.02); *H04W 76/15* (2018.02);
(Continued)

(58) Field of Classification Search
CPC ... H04B 7/02–12; H04B 17/0082–409; H04W 24/02–10; H04W 28/02–26;
(Continued)

(56) References Cited

U.S. PATENT DOCUMENTS

| 2017/0013485 | A1* | 1/2017 | Chang | .................... H04W 24/10 |
| 2021/0377753 | A1* | 12/2021 | Li | .......................... H04W 24/10 |
| 2022/0386160 | A1* | 12/2022 | Wang | .................... H04W 24/10 |

FOREIGN PATENT DOCUMENTS

| CN | 102404770 A | 4/2012 | |
| CN | 103596213 A | 2/2014 | |
| CN | 110475281 A | 11/2019 | |
| CN | 110933700 A | 3/2020 | |
| CN | 110972185 A * | 4/2020 | ............ H04W 24/10 |

OTHER PUBLICATIONS

Written Opinion issued in corresponding International Application No. PCT/CN2021/086173, mailed Jul. 14, 2021, 3 pages (Year: 2021).*

(Continued)

*Primary Examiner* — Timothy J Weidner
(74) *Attorney, Agent, or Firm* — IPX PLLC (57) ABSTRACT

A Layer 2 measurement method and a network side device are provided. The Layer 2 measurement method is performed by the network side device and includes: obtaining measurement information required for measuring a Layer 2 measurement object; and obtaining a Layer 2 measurement result according to the measurement information. The Layer 2 measurement result includes at least a result obtained by measuring the Layer 2 measurement object of a packet transmitted through an interface between a master node and a secondary node.

19 Claims, 3 Drawing Sheets

Obtain measurement information required for measuring a Layer 2 measurement object — 31

Obtain a Layer 2 measurement result according to the measurement information, where the Layer 2 measurement result includes at least a result obtained by measuring the Layer 2 measurement object of a packet transmitted through an interface between a master node and a secondary node — 32

(51) Int. Cl.
  *H04W 76/12*  (2018.01)
  *H04W 76/15*  (2018.01)
  *H04W 84/02*  (2009.01)
  *H04W 88/02*  (2009.01)
  *H04W 88/08*  (2009.01)
  *H04W 88/12*  (2009.01)
  *H04W 92/02*  (2009.01)
  *H04W 92/10*  (2009.01)
  *H04W 92/12*  (2009.01)

(52) U.S. Cl.
  CPC ............ *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01)

(58) Field of Classification Search
  CPC ........... H04W 36/0005–385; H04W 76/10–50; H04W 84/02–16; H04W 88/02–12; H04W 92/02–24
  See application file for complete search history.

(56) References Cited

OTHER PUBLICATIONS

First Office Action issued in related Chinese Application No. 202010276320.5, mailed Dec. 5, 2022, 4 pages.

International Search Report issued in corresponding International Application No. PCT/CN2021/086173, mailed Jul. 14, 2021, 4 pages.

Huawei. Summary of offline discussion for CB: # 33_Email033-MDT_EN-DC, 3GPP TSG-RAN3 Meeting #107-e, R3-201136, Mar. 6, 2020, 9 pages.

Huawei, HiSilicon. Discussion on the throughput measurement in the MR-DC, 3GPP TSG-RAN WG2 Meeting #108, R2-1915860, Nov. 22, 2019, 2 pages.

Second Office Action issued in related Chinese Application No. 202010276320.5, mailed May 27, 2023, 4 pages.

Fujitsu, "Discussion on L2 measurement in DC", 3GPP TSG-RAN WG2 Meeting #86, R2-142260, May 2014, 5 pages.

* cited by examiner

LAYER 2 MEASUREMENT METHOD AND NETWORK SIDE DEVICE

CROSS-REFERENCE TO RELATED APPLICATIONS

This application is a continuation of International Application No. PCT/CN2021/086173, filed on Apr. 9, 2021, which claims priority to Chinese Patent Application No. 202010276320.5, filed on Apr. 9, 2020. The entire contents of each of the above-referenced applications are expressly incorporated herein by reference.

TECHNICAL FIELD

Embodiments of the present disclosure relate to the field of wireless communications technologies, and in particular to a Layer 2 measurement method and a network side device.

BACKGROUND

A Dual Connectivity (DC) architecture is used in the 5$^{th}$ Generation (5G) system, that is, one user can be connected to two different base stations simultaneously. For example, two base stations accessed by the user support Long Term Evolution (LTE) and New Radio (NR), respectively. One of the two base stations may be called a Master Node (MN), and the other base station may be called a Secondary Node (SN). A Master Cell Group (MCG) is a cell group that the user accesses on the MN. A Secondary Cell Group (SCG) is a cell group that the user accesses on the SN.

In the 5G system, because the dual connectivity architecture is used and a duplication function of a Packet Data Convergence Protocol (PDCP) is supported, different types of bearer types are generated, including: an MCG bearer, an SCG bearer, an MCG split bearer, an SCG split bearer, an MN terminated SCG bearer, and an SN terminated MCG bearer.

To detect network performance, Layer 2 (L2) measurement is required on a network side. However, current Layer 2 measurement does not apply to the MN terminated SCG bearer and SN-terminated MCG bearer.

SUMMARY

Embodiments of the present disclosure provide a Layer 2 measurement method and a network side device.

The present disclosure are implemented as follows:

According to a first aspect, an embodiment of the present disclosure provides a Layer 2 measurement method, applied to a network side device and including:

obtaining measurement information required for measuring a Layer 2 measurement object; and obtaining a Layer 2 measurement result according to the measurement information, where the Layer 2 measurement result includes at least a result obtained by measuring the Layer 2 measurement object of a packet transmitted through an interface between a master node and a secondary node.

According to a second aspect, an embodiment of the present disclosure provides a network side device, including:

an obtaining module, configured to obtain measurement information required for measuring a Layer 2 measurement object; and a measuring module, configured to obtain a Layer 2 measurement result according to the measurement information, where the Layer 2 measurement result includes at least a result obtained by measuring the Layer 2 measurement object of a packet transmitted through an interface between a master node and a secondary node.

According to a third aspect, an embodiment of the present disclosure provides a network side device, including a processor, a memory, and a computer program that is stored in the memory and that can be run on the processor, where when the computer program is executed by the processor, steps of the Layer 2 measurement method in the foregoing first aspect are implemented.

According to a fourth aspect, an embodiment of the present disclosure provides a computer-readable storage medium, where the computer-readable storage medium stores a computer program, and when the computer program is executed by a processor, steps of the Layer 2 measurement method in the foregoing first aspect are implemented.

According to a fifth aspect, an embodiment of the present disclosure provides a computer software product, where the computer software product is stored in a non-volatile storage medium, and the software product is configured to be executed by at least one processor to implement the steps of the Layer 2 measurement method in the foregoing first aspect.

The MN-terminated SCG bearer and the SN-terminated MCG bearer involve data transmission through an interface between the master node and the secondary node. Based on this, in this embodiment of the present disclosure, when Layer 2 measurement is performed, the Layer 2 measurement object of a packet transmitted through the interface between the master node and the secondary node is measured. Therefore, when the bearer type is the MN-terminated SCG bearer and the SN-terminated MCG bearer, a more reliable measurement result can be obtained.

BRIEF DESCRIPTION OF DRAWINGS

With reference to detailed descriptions in implementation manners in the following descriptions, various other advantages and benefits become clear to a person of ordinary skills in the art. The accompanying drawings are merely used to show implementation manners, and are not considered as limitations to the present disclosure. In addition, in all the accompanying drawings, a same reference symbol is used to represent a same part. In the accompanying drawings.

DETAILED DESCRIPTION

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such process, method, product, or device. In addition, "and/or" used in the specification and the claims means at least one of the connected objects. For example, A and/or B represents the following three cases: only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure will be described below with reference to the accompanying drawings. A Layer 2 measurement method and a network side device provided in the embodiments of the present disclosure can be applied to a wireless communications system. The wireless communications system may be a 5G system, an evolved Long Term Evolution (eLTE) system, or a subsequent evolved communications system.

Figure 1:
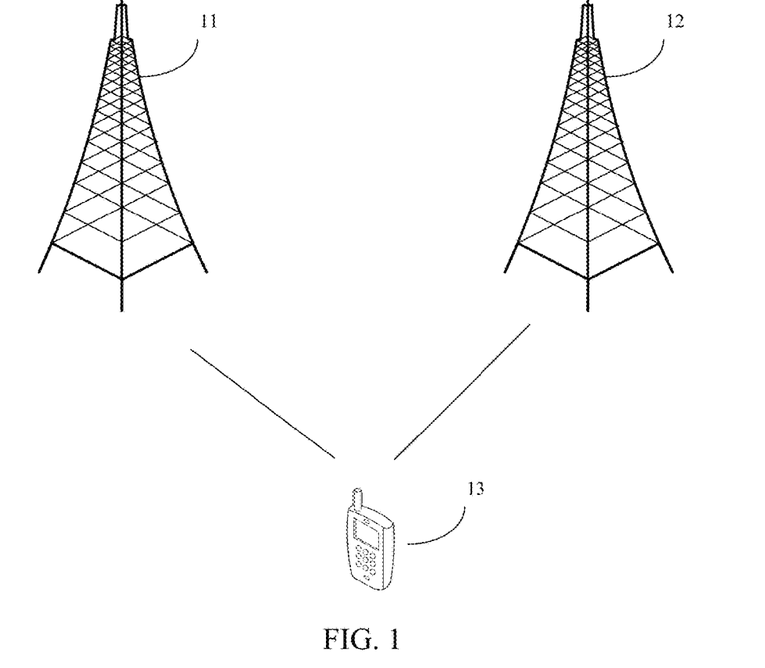
FIG. 1 is a schematic architectural diagram of a wireless communications system according to an embodiment of the present disclosure.

Referring to FIG. 1, FIG. 1 is a schematic architectural diagram of a wireless communications system according to an embodiment of the present disclosure. As shown in FIG. 1, the wireless communications system may include: a master node 11, a secondary node 12, and a terminal 13, and the terminal 12 may be connected to the master node 11 and the secondary node 12 simultaneously.

It should be noted that the foregoing communications system may include multiple terminals 13, and the master node 11 and the secondary node 12 may communicate with the multiple terminals 13 (transmit signaling or transmit data).

The master node 11 and the secondary node 12 provided in this embodiment of the present disclosure may be base stations, and the base stations may be commonly used base stations, or may be evolved Node Base stations (eNBs), or may further be network side devices (such as next generation Node Base stations (gNBs)) or Transmission and Reception Points (TRP)), cells, or other devices in the 5G system, or may be network side devices in a subsequent evolved communications system. The master node 11 and the secondary node 12 may be base stations with a same access technology. For example, both are LTE stations. The master node 11 and the secondary node 12 may also be base stations with different access technologies. For example, one is an NR base station and the other is an LTE base station. Such architecture is called Multi-RAT Dual Connectivity (MR-DC).

A terminal 13 provided in this embodiment of the present disclosure may be a mobile phone, a tablet computer, a notebook computer, an Ultra-Mobile Personal Computer (UMPC), a netbook, a Personal Digital Assistant (PDA), or the like.

Figure 2:
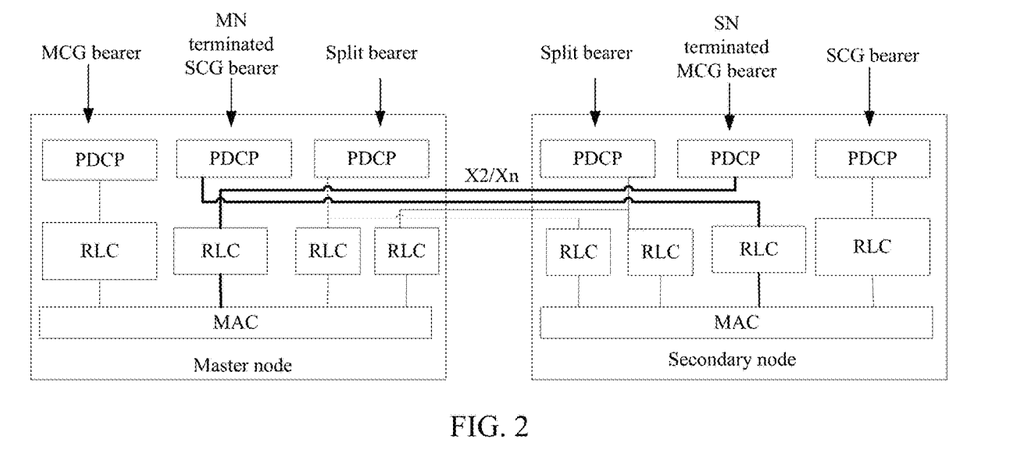
FIG. 2 is a schematic diagram of a correspondence between protocol entities and nodes with different bearer types.

Referring to FIG. 2, FIG. 2 is a schematic diagram of a correspondence between protocol entities and nodes with different bearer types. Radio bearers established by the network side device in FIG. 2 include the following.

1) MCG bearer: Data in the bearer will be transmitted to a user through an MN. A PDCP entity, a Radio Link Control (RLC) entity, and a Medium Access Control (MAC) entity corresponding to the bearer are all located in the MN.

2) SCG bearer: Data in the bearer will be transmitted to the user through an SN, and a PDCP entity, an RLC entity, and an MAC entity corresponding to the bearer are all located in the SN.

3) MCG split bearer: Data in the bearer will be transmitted to the user through an MN and an SN. For one PDCP entity, two RLC entities, and two MAC entities corresponding to the bearer, the one PDCP entity is located in the MN, one of the two RLC entities is located in the MN and the other is located in the SN, and one of the two MAC entities is located in the MN and the other is located in the SN.

4) SCG split bearer: Data in the bearer will be transmitted to the user through an MN and an SN. For one PDCP entity, two RLC entities, and two MAC entities corresponding to the bearer, the one PDCP entity is located in the SN, one of the two RLC entities is located in the MN and the other is located in the SN, and one of the two MAC entities is located in the MN and the other is located in the SN.

5) MN terminated SCG bearer: Data in the bearer will be transmitted to the user through an MN and an SN, and a PDCP entity corresponding to the bearer is located in the MN, and an RLC entity and an MAC entity are located in the SN.

6) SN terminated MCG bearer: Data in the bearer will be transmitted to the user through an MN and an SN, a PDCP entity corresponding to the bearer is located in the SN, and an RLC entity and an MAC entity are located in the MN.

When the MN-terminated SCG bearer or the SN-terminated MCG bearer is configured for a terminal, uplink data and downlink data between the network side device and the terminal need to additionally pass through an interface between the MN and the SN, such as an X2 interface or an Xn interface. However, existing Layer 2 measurement does not involve measurement for an interface between the master node and the secondary node. For the MN-terminated SCG bearer and the SN-terminated MCG bearer, it is difficult to obtain a reliable measurement result through the current Layer 2 measurement.

X2 is an interface between a master node and a secondary node in non-standalone networking; and Xn is an interface between a master node and a secondary node in standalone networking.

Figure 3:
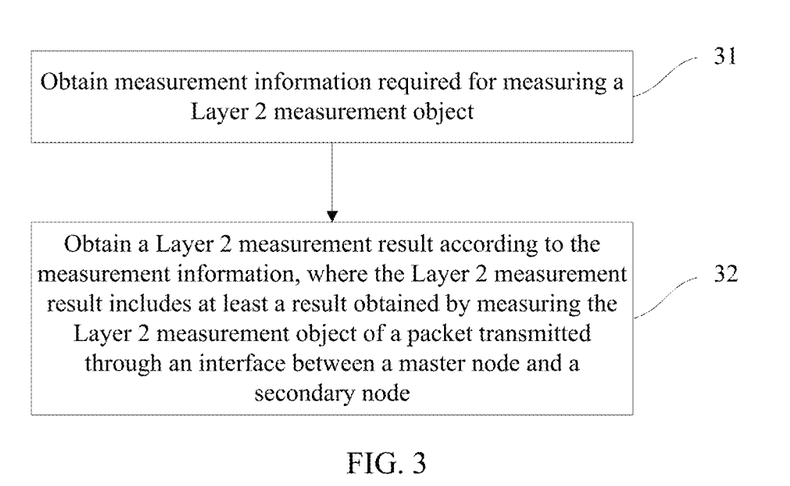
FIG. 3 is a schematic flow chart of a Layer 2 measurement method according to an embodiment of the present disclosure.

FIG. 3 is a schematic flow chart of a Layer 2 measurement method according to an embodiment of the present disclosure. The Layer 2 measurement method is applied to a network side device, including:

Step 31: Obtain measurement information required for measuring a Layer 2 measurement object; and Step 32: Obtain a Layer 2 measurement result according to the measurement information, where the Layer 2 measurement result includes at least a result obtained by measuring the Layer 2 measurement object of a packet transmitted through an interface between a master node and a secondary node.

In this embodiment of the present disclosure, the network side device is a master node or a secondary node in a Dual-Connectivity (DC) network architecture or an MR-DC network architecture.

In some embodiments, when a bearer type is an MN-terminated SCG bearer or an SN-terminated MCG bearer, the measurement information required for measuring the Layer 2 measurement object is obtained.

The MN-terminated SCG bearer and the SN-terminated MCG bearer involve data transmission through an interface between the master node and the secondary node. Based on this, in this embodiment of the present disclosure, when Layer 2 measurement is performed, the Layer 2 measurement object of a packet transmitted through the interface between the master node and the secondary node is measured. Therefore, when the bearer type is the MN-terminated SCG bearer and the SN-terminated MCG bearer, a more reliable measurement result can be obtained.

In this embodiment of the present disclosure, the Layer 2 measurement object includes at least one of the following: a Layer 2 packet delay, a Layer 2 throughput, or a Layer 2 packet loss rate. In this embodiment of the present disclosure, the Layer 2 measurement object is diversified, so that a more reliable measurement result can be obtained.

When the Layer 2 measurement object is the Layer 2 packet delay, measurement information required for measuring the Layer 2 packet delay may include at least one of the following: receiving time for a PDCP entity of a transmit end receives a data packet, a response time for an MAC entity receives a data packet sent by a peer, or the like.

When the Layer 2 measurement object is the Layer 2 throughput, the measurement information required for measuring the Layer 2 throughput may include a total number of data packets received per unit time, and the like.

When the Layer 2 measurement object is the Layer 2 packet loss rate, measurement information required for measuring the Layer 2 packet loss rate may include at least one of the following: the number of lost data packets within a specified time, the total number of data packets within the specified time, or the like.

In this embodiment of the present disclosure, the Layer 2 measurement object may include a downlink Layer 2 measurement object, and may also include an uplink Layer 2 measurement object, or both include the downlink Layer 2 measurement object and the uplink Layer 2 measurement object, so that uplink data and/or downlink data can be monitored as required.

That is, the Layer 2 packet delay includes at least one of the following: a Layer 2 downlink (L2 DL) packet delay and a Layer 2 uplink (L2 UL) packet delay.

The Layer 2 throughput includes at least one of the following: a Layer 2 downlink throughput and a Layer 2 uplink throughput.

The Layer 2 packet loss rate includes at least one of the following: a Layer 2 downlink packet loss rate and a Layer 2 uplink packet loss rate.

In some embodiments of the present disclosure, the Layer 2 measurement object is a downlink Layer 2 measurement object, and the Layer 2 measurement result further includes at least one of the following:
  a result obtained by measuring the downlink Layer 2 measurement object of a packet transmitted through an air interface (that is, a Uu interface) between the network side device and the terminal;
  a result obtained by measuring the downlink Layer 2 measurement object of a packet transmitted through an interface (that is, an F1-U interface) between a CU and a DU when the network side device is a Centralized Unit-Distributed Unit CU-DU architecture; or
  a result obtained by measuring the downlink Layer 2 measurement object of a PDCP Service Data Unit (SDU) transmitted to a CU User Plane (UP) when the network side device is a CU-DU architecture.

In some embodiments, when the network side device is the CU-DU architecture, the air interface between the network side device and the terminal is an air interface (that is, the Uu interface) between the DU and the terminal.

In some embodiments of the present disclosure, the Layer 2 measurement object is an uplink Layer 2 measurement object, and the Layer 2 measurement result further includes at least one of the following:
  an air interface from the terminal to the network side device;
  a result obtained by measuring the uplink Layer 2 measurement object of a packet transmitted through an air interface (that is, a Uu interface) between the network side device and a terminal; and
  a result obtained by measuring the uplink Layer 2 measurement object of a packet transmitted through an interface (that is, an F1-U interface) between a CU and a DU when the network side device is a CU-DU architecture.

In some embodiments of the present disclosure, if the network side device is the master node in dual connectivity (DC or MR-DC), the obtaining measurement information required for measuring the Layer 2 measurement object includes:
  receiving at least a part of the measurement information required for measuring the Layer 2 measurement object sent by a secondary node.

In some embodiments of the present disclosure, if the network side device is the secondary node in dual connectivity, the obtaining measurement information required for measuring the Layer 2 measurement object includes:
  receiving at least a part of measurement information required for measuring the Layer 2 measurement object and sent by the master node.

In some embodiments of the present disclosure, if the network side device is the master node in dual connectivity, after the obtaining a Layer 2 measurement result according to the measurement information, the method further includes:
  sending the Layer 2 measurement result to the secondary node.

In some embodiments of the present disclosure, if the network side device is the secondary node in the dual connectivity, after the obtaining a Layer 2 measurement result according to the measurement information, the method further includes:
  sending the Layer 2 measurement result to the master node.

In some embodiments of the present disclosure, after the obtaining a Layer 2 measurement result according to the measurement information, the method further includes: sending the Layer 2 measurement result to the terminal, so that the terminal can obtain information about network performance.

The foregoing Layer 2 measurement method according to an embodiment of the present disclosure will be described below with reference to the following embodiments.

EMBODIMENT 1

A network side device obtains measurement information required for measuring a L2 DL packet delay, and obtains a Layer 2 measurement result according to the measurement information.

The Layer 2 downlink packet delay includes:

D1: a Layer 2 downlink packet delay of a packet transmitted through an interface (an X2 or Xn interface) between a master node and a secondary node;

D2: a Layer 2 downlink packet delay of a packet transmitted through an air interface (that is, a Uu interface) between a DU and a terminal when the network side device is a CU-DU architecture;

D3: a Layer 2 downlink packet delay of a packet transmitted of an interface between a CU and a DU (that is, an F1-U interface) when the network side device is the CU-DU architecture; and D4: a Layer 2 downlink packet delay of a PDCP SDU transmitted to a CU UP.

EMBODIMENT 2

A network side device obtains measurement information required for measuring a L2 UL packet delay, and obtains a Layer 2 measurement result according to the measurement information.

The Layer 2 uplink packet delay includes:

D1: a Layer 2 uplink packet delay of a packet transmitted through an interface (an X2 or Xn interface) between a master node and a secondary node;

D2: a Layer 2 uplink packet delay of a packet transmitted through an air interface (that is, a Uu interface) between a DU and a terminal when the network side device is a CU-DU architecture; and D3: a Layer 2 uplink packet delay of a packet transmitted through an interface (that is, an F1-U interface) between a CU and the DU when the network side device is the CU-DU architecture.

Figure 4:
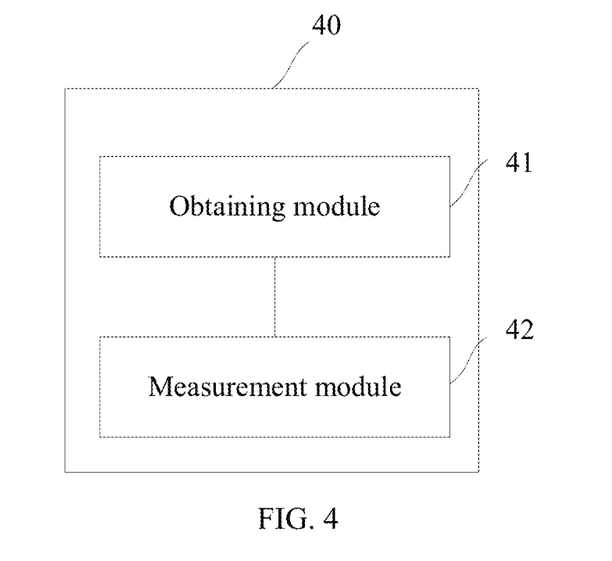
FIG. 4 is a schematic structural diagram of a network side device according to an embodiment of the present disclosure.

Referring to FIG. 4, an embodiment of the present disclosure further provides a network side device 40, including:

an obtaining module 41, configured to obtain measurement information required for measuring a Layer 2 measurement object; and a measuring module 42, configured to obtain a Layer 2 measurement result according to the measurement information, where the Layer 2 measurement result includes at least a result obtained by measuring the Layer 2 measurement object of a packet transmitted through an interface between a master node and a secondary node.

In this embodiment of the present disclosure, when Layer 2 measurement is performed, the Layer 2 measurement object of a packet transmitted through the interface between the master node and the secondary node is measured. Therefore, when a bearer type is an MN-terminated SCG bearer and an SN-terminated MCG bearer, a more reliable measurement result can be obtained.

In some embodiments, the Layer 2 measurement object is a downlink Layer 2 measurement object, and the Layer 2 measurement result further includes at least one of the following:

a result obtained by measuring the downlink Layer 2 measurement object of a packet transmitted through an air interface between the network side device and a terminal;

a result obtained by measuring the downlink Layer 2 measurement object of a packet transmitted through an interface between a CU and a DU when the network side device is a CU-DU architecture; or a result obtained by measuring the downlink Layer 2 measurement object of a packet data convergence protocol service data unit PDCP SDU transmitted to a CU user plane when the network side device is a CU-DU architecture.

In some embodiments, when the network side device is the CU-DU architecture, the air interface between the network side device and the terminal is an air interface between the DU and the terminal.

In some embodiments, the Layer 2 measurement object is an uplink Layer 2 measurement object, and the Layer 2 measurement result further includes at least one of the following:

a result obtained by measuring the uplink Layer 2 measurement object of a packet transmitted through an air interface between the network side device and a terminal; and a result obtained by measuring the uplink Layer 2 measurement object of a packet transmitted through an interface between a CU and a DU when the network side device is a CU-DU architecture.

In some embodiments, when the network side device is the CU-DU architecture, the air interface between the network side device and the terminal is an air interface between the DU and the terminal.

In some embodiments, if the network side device is the master node in dual connectivity, the obtaining module includes:

a first receiving unit, configured to receive at least a part of the measurement information required for measuring the Layer 2 measurement object sent by the secondary node.

In some embodiments, if the network side device is the secondary node in dual connectivity, the obtaining module includes:

a second receiving unit, configured to receive at least a part of measurement information required for measuring the Layer 2 measurement object sent by the master node.

In some embodiments, if the network side device is the master node in dual connectivity, the network side device further includes:

a first sending module, configured to send the Layer 2 measurement result to the secondary node.

In some embodiments, if the network side device is the secondary node in dual connectivity, the network side device further includes:

a second sending module, configured to send the Layer 2 measurement result to the master node.

In some embodiments, the network side device 40 further includes:

a third sending module, configured to send the Layer 2 measurement result to a terminal.

In some embodiments, the Layer 2 measurement object includes at least one of the following: a Layer 2 packet delay, a Layer 2 throughput, or a Layer 2 packet loss rate.

The terminal provided in this embodiment of the present disclosure can implement the processes implemented by the terminal in the method embodiment in FIG. 3. To avoid repetition, details are not described herein again.

Figure 5:
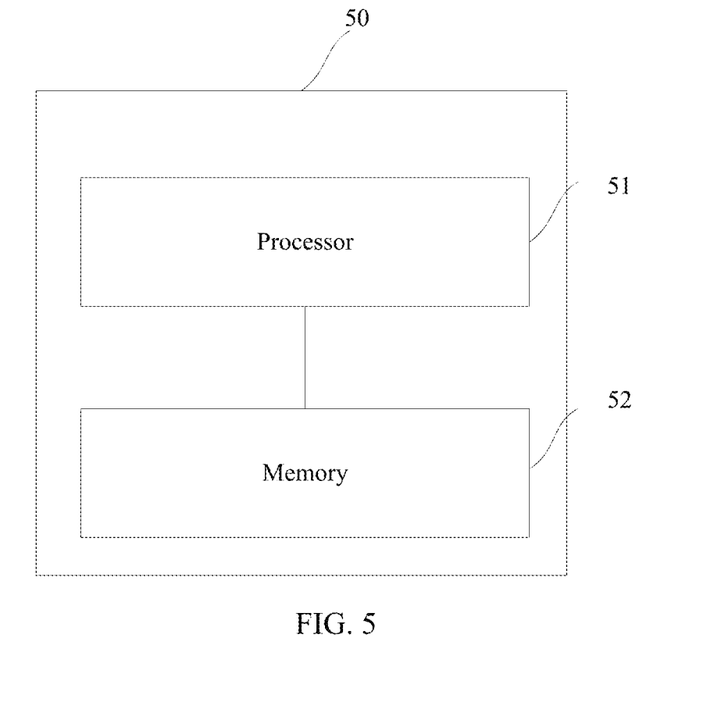
FIG. 5 is a schematic structural diagram of a network side device according to another embodiment of the present disclosure.

Refer to FIG. 5, an embodiment of the present disclosure further provides a network side device 50, including a processor 51, a memory 52, and a computer program that is stored in the memory 52 and that can be run on the processor 51. When the computer program is executed by the processor 51, processes of the embodiments of the foregoing Layer 2 measurement method can be implemented, and a same technical effect can be achieved. To avoid repetition, details are not described herein again.

An embodiment of the present disclosure further provides a computer-readable storage medium. The computer-readable storage medium stores a computer program, where when the computer program is executed by a processor, processes of embodiments the foregoing Layer 2 measurement method are implemented, and a same technical effect can be achieved. To avoid repetition, details are not described herein again.

The computer-readable storage medium includes a Read-only Memory (ROM), a Random Access Memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by the statement "including a . . ." does not exclude another same element in this process, method, article, or apparatus that includes the element.

It may be clearly understood by a person skilled in the art that, for convenience and brevity of description, for a working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the foregoing method embodiments may be implemented by software in addition to a necessary universal hardware platform or by hardware only. In most circumstances, the former is an exemplary implementation manner. Based on such understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods described in the embodiments of the present disclosure.

A person of ordinary skill in the art may understand that all or some of the processes in the foregoing method embodiments may be implemented by using a computer program to control related hardware. The program may be stored in a computer readable storage medium. When the program is executed, the processes in the foregoing method embodiments may be performed. The foregoing storage medium may include: a magnetic disk, an optical disc, a ROM, a RAM, or the like.

It can be understood that the embodiments described in the present disclosure may be implemented by hardware, software, firmware, middleware, microcode, or a combination thereof. For implementation with hardware, the module, unit, and subunit may be implemented in one or more Application Specific Integrated Circuits (ASICs), Digital Signal Processors (DSPs), DSP devices (DSPDs), Programmable Logic Devices (PLDs), Field-Programmable Gate Array (FPGA), general processors, controllers, micro-controllers, micro-processors, and other electronic units for implementing the functions of the present application, or their combinations.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of the present disclosure are described above with reference to the accompanying drawings, but the present disclosure is not limited to the foregoing implementation manners. The foregoing implementation manners are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. A Layer 2 measurement method, performed by a network side device, comprising:
   obtaining a Layer 2 DownLink (DL) packet delay or a layer 2 UpLink (UL) packet delay, wherein the Layer 2 DL packet delay comprises;
   D1 which is a delay of a packet transmitted through an interface between a Master Node (MN) and a Secondary Node (SN);
   D2 which is a delay of a packet transmitted through an air interface between a Distributed Unit (DU) and a terminal;
   D3 which is a delay of a packet transmitted through an interface between a Centralized Unit (CU) and a DU; and
   D4 which is a delay a Packet Data Convergence Protocol Service Data Unit (PDCP SDU) transmitted in a CU User Plane (UP),
   wherein the Layer 2 UL packet delay comprises:
   the D1, the D2, and the D3.

2. The Layer 2 measurement method according to claim 1, wherein the network side device is a CU-DU architecture.

3. The Layer 2 measurement method according to claim 1, wherein the obtaining a Layer 2 DL packet delay or a layer 2 UL packet delay comprises:

obtaining the Layer 2 DL packet delay or the Layer 2 UL packet delay according to measurement information.

4. The Layer 2 measurement method according to claim 3, further comprising:
obtaining the measurement information.

5. The Layer 2 measurement method according to claim 4, wherein:
when the network side device is the MN in dual connectivity, obtaining the measurement information sent by the SN; and
when the network side device is the SN in dual connectivity, obtaining the measurement information sent by the MN.

6. The Layer 2 measurement method according to claim 1, wherein
when the network side device is the MN in dual connectivity, after the obtaining a Layer 2 DL packet delay or a Layer 2 UL packet delay, the method further comprises:
sending the Layer 2 DL packet delay or the Layer 2 UL packet delay to the SN; and
when the network side device is the SN in the dual connectivity, after the obtaining the Layer 2 DL packet delay or the Layer 2 UL packet delay, the method further comprises:
sending the Layer 2 DL packet delay or the Layer 2 UL packet delay to the MN.

7. The Layer 2 measurement method according to claim 1, wherein after obtaining a Layer 2 DL packet delay or a layer 2 UL packet delay, the method further comprises:
sending the Layer 2 DL packet delay or the Layer 2 UL packet delay to a terminal.

8. A network side device, comprising: a memory having a computer program stored thereon; a processor, wherein the computer program, when executed by the processor, causes the processor to perform a Layer 2 measurement method, comprising:
obtaining a Layer 2 DownLink (DL) packet delay or a Layer 2 UpLink (UL) packet delay, wherein the Layer DL packet delay comprises;
D1 which is a delay of a packet transmitted through an interface between a Master Node (MN) and a Secondary Node (SN);
D2 which is a delay of a packet transmitted through an air interface between a Distributed Unit (DU) and a terminal;
D3 which is a delay of a packet transmitted through an interface between a Centralized Unit (CU) and a DU; and
D4 which is a delay a Packet Data Convergence Protocol Service Data Unit (PDCP SDU) transmitted in a CU User Plane (UP),
wherein the layer 2 UL packet delay comprises:
the D1, the D2, and the D3.

9. The network side device according to claim 8, wherein the network side device is a CU-DU architecture.

10. The network side device according to claim 8, wherein the obtaining a Layer 2 DL packet or a layer 2 UL packet delay comprises:
obtaining the layer 2 DL packet or the layer 2 UL packet delay according to measurement information.

11. The network side device according to claim 10, further comprising:
obtaining the measurement information.

12. The network side device according to claim 11, wherein;

when the network side device is the MN in dual connectivity, obtaining the measurement information sent by the SN; and
when the network side device is the SN in dual connectivity, obtaining the measurement information sent by the MN.

13. The network side device according to claim 8, wherein
when the network side device is the MN in dual connectivity, after the obtaining a layer 2 DL packet or a layer 2 UL packet delay, the method further comprises:
sending the Layer 2 DL packet or the Layer 2 UL packet delay to the SN; and
when the network side device is the SN in the dual connectivity, after the obtaining the layer 2 DL packet or the Layer 2 UL packet delay, the method further comprises:
sending the Layer 2 DL packet or the Layer 2 UL packet delay to the MN.

14. The network side device according to claim 8, wherein after obtaining the Layer 2 DL packet or the layer 2 UL packet delay, the method further comprises:
sending the Layer 2 DL packet or the Layer 2 UL packet delay to a terminal.

15. A non-transitory computer-readable storage medium storing a computer program, wherein the computer program, when executed by a processor, causes the processor to perform a Layer 2 measurement method, comprising:
obtaining a Layer 2 DownLink (DL) packet delay or a Layer 2 UpLink (UL) packet delay, wherein the Layer 2 DL packet delay comprises;
D1 which is a delay of a packet transmitted through an interface between a Master Node (MN) and a Secondary Node (SN);
D2 which is a delay of a packet transmitted through an air interface between a Distributed Unit (DU) and a terminal;
D3 which is a delay of a packet transmitted through an interface between a Centralized Unit (CU) and a DU; and
D4 which is a delay a Packet Data Convergence Protocol Service Data Unit (PDCP SDU) transmitted in a CU User Plane (UP),
wherein the Layer 2 UL packet delay comprises:
the D1, the D2, and the D3.

16. The non-transitory computer-readable storage medium according to claim 15, wherein the network side device is a CU-DU architecture.

17. The non-transitory computer-readable storage medium according to claim 15, wherein
when the network side device is the MN in dual connectivity, the obtaining a Layer 2 DL packet or a Layer 2 UL packet delay comprises:
obtaining the Layer 2 DL packet or the Layer 2 UL packet delay according to measurement information.

18. The non-transitory computer-readable storage medium according to claim 15, wherein
when the network side device is the MN in dual connectivity, after the obtaining a Layer 2 DL packet or a Layer 2 UL packet delay, the method further comprises:
sending the Layer 2 DL packet or the Layer 2 UL packet delay to the SN; and
when the network side device is the SN in the dual connectivity, after the obtaining the Layer 2 DL packet or the Layer 2 UL packet delay, the method further comprises:
sending the Layer 2 DL packet or the Layer 2 UL packet delay to the MN.

19. The non-transitory computer-readable storage medium according to claim 15, wherein after obtaining the Layer 2 DL packet or the Layer 2 UL packet delay, the method further comprises:
   sending the Layer 2 DL packet or the Layer 2 UL packet delay to a terminal.

* * * * *